United States Patent [19]

Ide et al.

[11] 4,052,525

[45] Oct. 4, 1977

[54] MULTI-LAYER STRUCTURE ACRYLIC POLYMER COMPOSITION

[75] Inventors: Fumio Ide; Kazuo Kishida; Akira Hasegawa, all of Ohtake, Japan

[73] Assignee: Mitsubishi Rayon Co., Ltd., Tokyo, Japan

[21] Appl. No.: 679,712

[22] Filed: Apr. 23, 1976

[30] Foreign Application Priority Data

May 6, 1975 Japan .................................. 50-54364

[51] Int. Cl.$^2$ ........................ B32B 27/36; B32B 27/08
[52] U.S. Cl. .................................... 428/412; 428/474; 428/483; 428/515; 428/516; 428/517; 428/518; 428/519; 428/520; 428/522; 260/881; 260/885; 260/883; 260/884; 260/29.6 RB
[58] Field of Search ........ 428/483, 474, 412, 515–520, 428/522; 260/881, 885

[56] References Cited

U.S. PATENT DOCUMENTS

| | | | |
|---|---|---|---|
| 3,458,603 | 7/1969 | Griffin | 260/881 |
| 3,562,235 | 2/1971 | Ryan | 428/463 X |
| 3,651,005 | 3/1972 | Walus | 428/469 X |
| 3,681,167 | 8/1972 | Moore | 428/412 X |
| 3,804,925 | 4/1974 | Kato et al. | 260/29.6 T |
| 3,959,550 | 5/1976 | Guillod et al. | 260/881 X |

*Primary Examiner*—P. C. Ives
*Attorney, Agent, or Firm*—Oblon, Fisher, Spivak, McClelland & Maier

[57] ABSTRACT

A multi-layer structure polymer composition composed of an innermost layer (A), an elastomeric layer (B), an outermost layer (C), and at least one intermediate layer, said layer (A) having a glass transition temperature (Tg) of 10° C. or higher and consisting of the reaction product of 51 to 100 parts by weight of an alkyl methacrylate whose alkyl group has 4 or less carbon atoms, 0 to 49 parts by weight of a copolymerizable monomer, 0 to 10 parts by weight of a polyfunctional monomer, and 0.1 to 5 parts by weight of a graftlinking agent; said layer (B) having a glass transition temperature (Tg) of 0° C. or lower and consisting of the reaction product of 80 to 100 parts by weight of an alkyl acrylate whose alkyl group has 8 or less carbon atoms, 0 to 20 parts by weight of a copolymerizable monomer, 0 to 10 parts by weight of a polyfunctional monomer, and 0.1 to 5 parts by weight of a graftlinking agent; said layer (C) having a glass transition temperature (Tg) of 50° C. or higher and consisting of the reaction product of 51 to 100 parts by weight of an alkyl methacrylate whose alkyl group has 4 or less carbon atoms, and 0 to 49 parts by weight of a copolymerizable monomer; and said intermediate layer consisting of the reaction product of 10 to 90 parts by weight of an alkyl methacrylate whose alkyl group has 4 or less carbon atoms, 90 to 10 parts by weight of an alkyl acrylate whose alkyl group has 8 or less carbon atoms, 0 to 10 parts by weight of a polyfunctional monomer, and 0.1 to 5 parts by weight of a graftlinking agent. The said polymer composition is excellent in transparency, gloss, and resistance to stress whitening and has good resistance to weather and impact.

15 Claims, No Drawings

MULTI-LAYER STRUCTURE ACRYLIC POLYMER COMPOSITION

This invention relates to a weather- and impact-resistant polymer composition which is very excellent in transparency and resistance to stress whitening. More particularly, this invention relates to an acrylic resin composition which has an excellent transparency and gloss, is by no means whitened by folding, and has a multi-layer structure in which two alkyl methacrylate-based resin layers are formed on the inner and outer sides of an alkyl acrylate-based elastomer layer, and intermediate resin layers composed of an alkyl methacrylate and an alkyl acrylate are formed between said elastomer layer and said inner and outer alkyl methacrylate-based layers.

Because of their attractive appearance and distinguished weatherability, polymers of methacrylic esters, particularly methyl methacrylate are useful as molding materials, particularly injection-molding materials, and the usefulness is increased. However, they are still required to be further improved in impact resistance, particularly in resistance to stress crazing. Attempts have been made, on the other hand, to apply these materials having an excellent weatherability to a film or sheet field. However, unstretched film or sheet materials made from these polymers are too brittle to be handled in a usual manner. In order to overcome such disadvantages, there has been made a proposal to impart elasticity to the composition by incorporating an elastomer component into the composition. The resulting composition, however, is inferior in appearance and markedly low in weatherability due to the presence of the elastomer component, and there has never been produced a composition having satisfactory transparency and weatherability.

In order to overcome the above disadvantages from the standpoint of material for film, methacrylic ester-based multi-layer polymers containing an acrylic elastomer have been proposed. Since these polymers are produced by polymerizing methyl methacrylate and an alkyl acrylate while adding them portionwise on a core of a polyalkyl acrylate having a low Tg, they lose the excellent transparency of the methyl methacrylate resin itself, though they become capable of being formed into a film. The molded article has a uniformly and distinctly bluish haze and becomes susceptible to so-called stress whitening on being folded. Therefore, the practical use thereof is greatly restricted. Compositions for the purpose of improving the impact strength in which a polyalkylacrylate-based elastomeric polymer is arranged as a core of a multi-layer polymer are disclosed in, for example, U.S. Pat. Nos. 3,450,796; 3,812,205; and 3,562,235.

There have been made a few attempts to allow rigid resins such as polymethyl methacrylate, polystyrene or the like to be present in the core. Japanese Patent Publication No. 3,591/71 discloses a three-layer structure in which a crosslinked polyalkyl acrylate layer is arranged between the inner and outer layers of a rigid resin consisting mainly of methyl methacrylate (or styrene). Since each layer of said structure exists only in the form of a block, the shaped article becomes translucent and susceptible to stress whitening, and hence, the characteristic properties of the methyl methacrylate resin are lost. In addition, the composition is inferior in film-shapability, and therefore, it is not suitable as a material for film.

U.S. Pat. No. 3,793,402 discloses blending methyl methacrylate, polystyrene, or the like, with a polymer similar to that of the above-noted three-layer structure. Said polymer has a three layer structure in which a layer of an elastomeric polymer consisting of a lower alkyl acrylate or butadiene, is arranged between the inner and outer layers having a high Tg containing a crosslinking agent or a graftlinking agent, or a multi-layer structure in which this three-layer structure is repeated while maintaining the same order of layers, i.e. rigid/soft/rigid. It is proposed in said U.S. Patent that an impact resistant composition with an improved haze level is obtained by blending said structure with polymethyl methacrylate, polystyrene or the like.

However, such a composition is susceptible to folding stress whitening when molded into a film or sheet, and this is the essential defect of a polymer blend. Further, it is usual that the transparency is lower than that of polymethyl methacrylate or polystyrene. In the multi-layer polymer per se for blend, each layer is only present in the form of a block, and hence, a shaped article of the multi-layer polymer per se is opaque or translucent. The polymer, moreover, is hardly suitable as a material for film, because it is shapable into film only under conditions in narrow ranges.

As a result of extensive studies from the viewpoint of multi-layer structure, this invention provides a molding material for film or sheet and a general molding material, which retains the transparency and gloss characteristic of polymethyl methacrylate per se, and has no or substantially no susceptibility to stress whitening.

According to the present invention, there is provided a weather- and impact-resistant, highly transparent, and extremely stress-whitening-resistant polymer composition having a multi-layer structure, which comprises 5 to 35% by weight, based on the weight of the polymer composition, of an innermost layer (A) having a Tg of 10° C. or higher and consisting of 51 to 100 parts by weight of an alkyl methacrylate whose alkyl group has 4 or less carbon atoms, 0 to 49 parts by weight of a monomer having a copolymerizable double bond, 0 to 10 parts by weight of a polyfunctional monomer, and 0.1 to 5 parts by weight of a graftlinking agent; 5 to 45% by weight based on the weight of the polymer composition, of an elastomeric polymer layer (B) having a Tg of 0° C. or lower and consisting of 80 to 100 parts by weight of an alkyl acrylate whose alkyl group has 8 or less carbon atoms, 0 to 20 parts by weight of a monomer having a copolymerizable double bond, 0 to 10 parts by weight of a polyfunctional monomer, and 0.1 to 5 parts by weight of a graftlinking agent; 10 to 80% by weight, based on the weight of the polymer composition, of an outermost layer (C) having a Tg of 50° C. or higher and consisting of 51 to 100 parts by weight of an alkyl methacrylate whose alkyl group has 4 or less carbon atoms, and 0 to 49 parts by weight of a monomer having copolymerizable double bond, said layers (A), (B), and (C) being the basic structural units; and 5 to 35% by weight, based on the weight of the polymer composition of at least one intermediate layer consisting of the reaction product of 10 to 90 parts by weight of an alkyl methacrylate whose alkyl group has 4 or less carbon atoms, 90 to 100 parts by weight of an alkyl acrylate whose alkyl group has 8 or less carbon atoms, 0 to 10 parts by weight of a polyfunctional monomer, and 0.1 to 5 parts by weight of a graftlinking agent; nothing or at least one of said intermediate layers being present between the (A) and (B) layers and 1 or more of said intermediate layers being present between the (B) and (C) layers; and the alkyl methacrylate content of the intermediate layers being linearly increased in the direction from the elastomeric polymer layer (B) toward the innermost layer (A) or the outermost layer (C).

It has thus become possible to provide an acrylic polymer capable of being formed into film or sheet having excellent transparency and distinguished resistance to stress whitening, by introducing into the polymer a multi-layer structure in which the alkyl methacrylate content is linearly increased from the elastomeric polymer layer (B) toward the inner and outer layers and by tightly bonding the layers to one another by use of a graftlinking agent containing at least one allyl group, thereby keeping each layer of said multilayer structure from rupture during kneading the polymer in the molten state.

A detailed explanation of the multi-layer structure polymer according to this invention is made below. The polymer of the innermost layer (A) has a Tg of at least 10° C., preferably 50° C. or higher, and consists of a reaction product of 51 to 100, preferably 70 to 100 parts by weight of an alkyl methacrylate whose alkyl group has 4 or less carbon atoms, preferably methyl methacrylate, 0 to 49 parts by weight of a monomer having copolymerizable double bond, 0 to 10 parts by weight of a polyfunctional monomer, and 0.1 to 5 parts by weight of a graftlinking agent. As the alkyl methacrylate having an alkyl group of 4 or less carbon atoms for use in the layer (A) there is used at least one of butyl methacrylate, propyl methacrylate, ethyl methacrylate, and methyl methacrylate. A composition excellent in gloss and transparency is obtained particularly by using methyl methacrylate. As the monomer having a copolymerizable double bond, there are preferably used acrylic acid derivatives such as lower alkyl acrylates, lower alkoxy acrylates, cyanoethyl acrylate, acrylamide, acrylic acid, and methacrylic acid. Other monomers copolymerizable with the alkyl methacrylate, such as styrene, alkyl-substituted styrenes, acrylonitrile, and methacrylonitrile may also be used. However, the amount of certain monomers used should be properly controlled so that the transparency characteristic of the present polymer is not lost.

As the graftlinking agent, there are used allyl, methallyl, and crotyl esters of copolymerizable α,β-unsaturated monocarboxylic or dicarboxylic acids; triallyl cyanurate; and triallyl isocyannurate in an amount of 0.1 to 5 parts by weight. The allyl esters include those of acrylic acid, methacrylic acid, maleic acid, fumaric acid, and itaconic acid. Of these, allyl methacrylate is especially effective. On the other hand, the polyfunctional monomer has a double bond conjugated with the carboxyl group or the like, and in general, reacts more rapidly than the allyl, methallyl, and crotyl groups which are non-conjugated, to form a chemical bond. Because the reaction rate of allyl, methallyl, or crotyl group is low, a considerable amount thereof remains unreacted after completion of the polymerization in the layer and effectively acts on the reaction for forming the subsequent layer, thereby an intimate bond is formed between the two layers. The graftlinking agent is used in an amount of 0.1 to 5, preferably 0.5 to 2, parts by weight per 100 parts by weight of the (A) component. If the amount is less than 0.1 part, the amount of the effective graftlinkages is insufficient, so that an interlayer rupture is easily caused during the melt kneading prior to molding, even if a number of intermediate layers have been formed, and the desired molded articles having transparency and stress-whitening resistance are not obtained. If the amount of graftlinking agent exceeds 5 parts, the molded article becomes inferior particularly in elasticity and also unsatisfactory in mechanical properties, particularly in impact resistance.

The copolymerizable polyfunctional monomers which may be used include preferably ethylene glycol dimethacrylate, 1,3-butylene glycol dimethacrylate, 1,4-butylene glycol dimethacrylate, and propylene glycol dimethacrylate; divinylbenzene and alkylene glycol diacrylates. Although these monomers are effective in crosslinking the layer containing them per se, they take no part in bonding between the layer and the next layers. The intended polymer composition may be obtained without using such a polyfunctional monomer so long as an allyl ester is present. However, when a high strength at high temperatures is required for the polymer, it is preferable to add the said monomer. The amount of the (A) component occupies 5 to 35%, preferably 10 to 15%, by weight of the weight of the polymer composition.

After completion of the formation of the innermost layer polymer (A), the intermediate layers are grown thereon, if necessary, in such a manner that the ratio of the alkyl methacrylate to the alkyl acrylate is linearly decreased until formation of the elastomeric polymer layer (B). It is necessary to carry out the polymerization to form the intermediate layers in the presence of 0 to 10 parts by weight of a polyfunctional monomer and 0.1 to 5 parts by weight of a graftlinking agent to establish tight graftlinkages between successive layers.

The elastomeric polymer layer (B), the amount of which occupies 5 to 45% by weight of the weight of the total polymer composition, has a Tg of 0° C. or lower, preferably −30° C. or lower and consists of the reaction product of 80 to 100 parts by weight of an alkyl acrylate whose alkyl group has 8 or less carbon atoms, 0 to 20 parts by weight of a monomer having a copolymerizable double bond, and 0.1 to 10 parts by weight of a polyfunctional monomer. The alkyl acrylates whose alkyl group has 8 or less carbon atoms include methyl acrylate, ethyl acrylate, butyl actylate, propyl acrylate, 2-ethylhexyl acrylate and the like. Of these acrylates, one that gives a homopolymer having a lower Tg is more desirable. The monomers having a copolymerizable double bond, the graftlinking agents, and the polyfunctional monomers used in forming the (B) component can be the same as those used in forming the (A) component. The (B) component is useful for imparting elastic properties to the present polymer composition having a multi-layer structure, and the amount thereof occupies 5 to 45%, preferably 15 to 35%, by weight of the weight of the final polymer composition.

The elastomeric polymer layer incorporated in the conventional resin composition to improve the impact resistance tends to bring about stress whitening and distinctly bluish haze. In the present polymer composition, such defects have been entirely eliminated by consecutive formation of multiple intermediate layers with a composition gradient as mentioned above.

The composition of the intermediate layers to be formed between the layer (B) and the outermost layer (C) is important and should vary so as to linearly increase the alkyl methacrylate content, preferably with an approximately constant gradient, to avoid abrupt change in the composition of successive layers. Such intermediate layers may be obtained by consecutive polymerization of the mixtures of an alkyl methacrylate and an alkyl acrylate in predetermined ratios conforming to the desired composition gradient, and in the presence of 0 to 10 parts by weight of a polyfunctional monomer and 0.1 to 5 parts by weight of a graftlinking agent per 100 parts by weight of the intermediate layers, similarly to the formation of intermediate layers between the layers (A) and (B). It is desirable to use the same species of alkyl methacrylate, lower alkyl acrylate, polyfunctional monomer, and graftlinking agent throughout the formation of the layers (A), (B), and (C) and the intermediate layers therebetween.

In the present polymer composition, the layers are efficiently graftlinked to one another. In spite of inclusion of a considerable amount of elastomeric polymer component in the polymer composition, the multi-layer structure according to the present invention is not whitened when subjected to stress, and is excellent in transparency. This effect has hitherto never been achieved by allowing an elastomeric component to be present as a core. For instance, as shown in Comparative Example (c), which will appear hereinafter, the properties aimed at by the present invention are not obtained by using an elastomeric component as a core and forming intermediate layers exclusively between the (B) and (C) layers. It is, for the first time, achieved by forming intermediate layers in which the alkyl methacrylate content is varied, not abruptly but linearly, along the thickness of the intermediate layers, including the (B) layer at the center.

There should be present at least one intermediate layer between the (B) and (C) layers. Although it is preferable that the same intermediate layers as between the (B) and (C) layers are present between the (A) and (B) layers, the intermediate layers between the layers (A) and (B) may be decreased in number depending on the requirements for the final polymer and, in some cases, they may be completely omitted, that is, the (B) layer may be directly bonded to the (A) layer. In the latter case, transparency and resistance to stress whitening are required to be maintained by properly controlling the alkyl methacrylate content of the intermediate layers between the (B) and (C) layers. In either case, the intermediate layers should occupy, in total, 5 to 35%, preferably 10 to 15% by weight of the weight of the polymer composition.

The outermost layer (C) should have a Tg of 50° C. or higher and consists of the reaction product of 51 to 100 parts by weight of an alkyl methacrylate whose alkyl group has 4 or less carbon atoms, preferably methyl methacrylate, and 0 to 49 parts by weight of a monomer having a copolymerizable double bond. Polymerization of the (C) layer is carried out preferably in the presence of a chain transfer agent to adjust the polymerization degree to a viscosity-average molecular weight of 50,000 to 1,000,000. The alkyl methacrylate whose alkyl group has 4 or less carbon atoms and the monomer having a copolymerizable double bond are the same as used in the (A) layer. The outermost layer (C) occupies 10 to 80%, preferably 35 to 70%, by weight of the weight of the polymer composition. Moldability of the present multi-layer structure polymer composition depends largely on the properties of the (C) layer.

With an increase in the proportion alloted to the (C) layer, the moldability of the present multi-layer structure polymer composition is more greatly improved. If the proportion of the (C) layer is below 10%, the polymer composition cannot give satisfactorily molded articles, while if the proportion exceeds 80%, the favorable effect of the intermediate layers on the polymer composition becomes less significant, resulting in decreased transparency and decreased resistance to stress whitening. The polymer composition becomes easily moldable when the proportion of the (C) layer in the polymer composition is 10 to 80%, preferably 35 to 70%.

Although an increase in number of layers favors the transparency and resistance to stress whitening, the most advantageous from the standpoint of productivity is a four-layer structure comprising the basic layers (A), (B), and (C) and one intermediate layer between the (B) and (C) layers, which is the case of the minimum number of layers.

The present polymer composition is easily obtained by the customary multi-stage sequential emulsion polymerization, which is carried out by continuously feeding the monomer or monomers to an aqueous dispersion or an emulsion containing previously formed polymer particles, under the conditions enabling seed polymerization to proceed on emulsion particles, without formation of fresh polymer particles. Polymerization of successive layers is continued one after another without interruption while adding dropwise the monomers successively. The initiators used are water-soluble persulfates and redox types. Any of the initiators may be used so long as it remains active throughout the duration of polymerization to form the final polymer composition. The amount of emulsifiers to be used is preferably 5% of less of the total of the monomers used in forming the final polymer composition. Preferable emulsifiers are common anionic surface-active agents.

The multi-stage sequentially produced polymer composition as mentioned above is coagulated by the usual method of salting out, dried, and granulated by means of an extruder. If required, the polymer can be incorporated with common light stabilizers, antioxidants, fillers, colorants, etc.

As mentioned above, the present multi-layer structure polymer composition has excellent characteristics as a molding material for film, sheet, and general molded articles. It may also be mixed with other thermoplastic resins, for example, homopolymers and copolymers of at least one monomer represented by the general formula,

wherein X is H, $CH_3$, Cl, F, Br, $COOCH_3$, CN, $OCOCH_3$, $C_6H_5$ or an alkoxy and Y is H, $CH_3$, Cl, Br or F; polycarbonates; polyesters; and polyamides, to exhibit characteristic features comparable or superior to those of the conventional reinforming materials for said thermoplastic resins.

In order to improve the impact resistance of the vinyl polymers, attempts have heretofore been made to incorporate a polymer containing a diene-based elastomeric polymer component into the vinyl polymer. In most of the cases, such a blend is susceptible to stress whitening and hardly retains transparency. It was also tried to retain transparency by equalizing the refractive indices of the resin component and the elastomeric polymer component. It is impossible, however, that the refractive indices of two polymers strictly coincide to each other over a wide range of temperature. Even if a blend is transparent at room temperature, it tends to become opaque at lower or higher temperatures. Thus, conventional blends have disadvantages yet to be improved. The above-noted disadvantages can be greatly improved by use of the present multi-layer structure polymer composition. Since the present polymer composition contains the specific intermediate layers having a composition gradient between the resin layer and the elastomer layer, it can be blended with a compatible polymer to obtain a composition excellent in transparency and resistance to stress whitening even if the refractive indices of both polymers do not strictly coincide. When the present polymer is incorporated into a methyl methylacrylated-based polymer, there is obtained a composition which is excellent in transparency, weatherability, and impact resistance and is hardly susceptible to stress whitening. If other elastomeric substances are blended in place of the present multi-layer structure polymer composition, the resulting composition generally becomes inferior in commercial value because of markedly reduced resistance to stress whitening and variable transparency due to the difference in refractive index of the polymer components depending on the temperature at which the article is used.

When the present polymer is blended with a polycarbonate resin, in particular, the latter is improved to a marked degree in impact strength, weatherability, processability, and cost.

Examples 7 and 8 which will appear hereinafter illustrate the above-noted advantages of the present polymer composition.

The invention is further explained in detail below referring to Examples, which are merely by way of illustration and not by way of limitation. In the Examples, the following abbreviations are used: methyl methacrylate (MMA), ethyl methacrylate (EMA), propyl methacrylate (PMA), butyl methacrylate (BMA), butyl acrylate (BuA), 2-ethylhexyl acrylate (2-EHA), ethylene glycol dimethacrylate (EDMA), allyl methacrylate (AMA), 1,3-butylene dimethacrylate (BD), triallyl isocyanurate (TAIC), triallyl cyanurate (TAC), cumene hydroperoxide (CHP), sodium formaldehyde sulfoxylate (SFS), and n-octylmercaptan (n-OSH). In the Examples, parts and percentages are by weight unless otherwise specified.

EXAMPLE 1

In a reactor provided with a condenser were charged 250 parts of ion-exchanged water, 1 part of sodium salt of a sulfosuccinate ester, and 0.05 part of SFS. To the resulting mixture, after having been stirred under a nitrogen stream, were added 10 parts of MMA containing 0.1% of CHP and 0.05 part of AMA (all monomers added in successive polymerization stages contained 0.1% of CHP unless otherwise indicated). While being agitated at 200 r.p.m. under a nitrogen stream, the reactor was heated to 70° C. and agitation was further continued for 30 minutes to complete polymerization of the (A) layer. Then a mixture of 9 parts of MMA, 6 parts of BuA, and 0.075 part of AMA was added to the reactor over a period of 10 minutes and the reactor was further agitated for 40 minutes to complete the second stage polymerization. Then, a third charge of 6 parts of MMA, 9 parts of BuA, and 0.075 part of AMA was added to the reactor over a period of 10 minutes and further agitated for 40 minutes to complete the polymerization of the third layer. Then, a fourth charge of 15 parts of BuA and 0.075 part of AMA was added to the reactor over a period of 10 minutes and further agitated for 50 minutes to complete the polymerization of the elastomeric polymer layer (B). In a manner similar to those mentioned above, the fifth and sixth layers were successively polymerized by using a fifth charge of 6 parts of MMA, 9 parts of BuA, and 0.075 part of AMA and a sixth charge of 9 parts of MMA, 6 parts of BuA, and 0.075 part of AMA, respectively. Then, the outermost layer (C) was polymerized by adding a seventh charge of 15 parts of MMA and 0.03 part of n-OSH over a period of 10 minutes to obtain a seven-layer structure polymer composition (Run No. 1). Electron-microscopic examination of the emulsion after each stage of polymerization confirmed that no fresh polymer particle had been formed, and hence, normal seed polymerization had proceeded in each stage of polymerization. The emulsion finally obtained was coagulated by the addition of aluminum chloride in an amount corresponding to 3% of the total weight of the polymers and heating with stirring. The coagulum was collected by filtration, washed with water, and dried to obtain a dry powder.

Another experiment (Run No. 2) was carried out in the same manner as in Run No. 1, except that the monomer ratio in each layer was varied as shown in Table 1.

Comparative experiments were carried out as shown in Table 1 [Comparative Examples (a), (b), and (c)]. There were obtained a copolymer consisting of 70 parts of MMA, 30 parts of BuA, and 0.2 part of n-OSH in Comparative Example (a), a block polymer of the so-called sandwich type in Comparative Example (b), and a polymer in which the innermost layer is an elastomeric polymer layer in Comparative Example (c).

The polymer compositions thus obtained were shaped by means of a 25 mm $\phi$ extruder (L/D of the screw = 24). Shapability of each polymer and transparency of pellets and resistance to folding stress whitening of strand prepared from each polymer were as shown in Table 1.

The polymers obtained in Run Nos. 1 and 2 and Comparative Example (a) were found to have desirable shapability and give uniform strands without melt fracture. The strands obtained from the polymers of Comparative Examples (b) and (c) showed melt fracture and were non-uniform because of insufficient elasticity. Pellets and strands obtained in Run Nos. 1 and 2 showed transparency comparable to that of PMMA, whereas those obtained in Comparative Example (c) showed distinctly bluish haze; those obtained from the copolymer of Comparative Example (a), which contained copolymerized BuA in an amount as high as 30%, showed markedly reduced transparency; and those obtained from the polymer of Comparative Example (b), which is a simple block polymer were milky white, and had no transparency.

One of the characteristic features of the present polymer composition is that it is resistant to stress whitening. As shown in Table 1, strands prepared from the polymers of the Comparative Examples were easily susceptible to folding stress whitening, whereas those prepared from the polymers of Example 1 according to this invention showed absolutely no stress whitening behavior.

Thus, it is confirmed that owing to the presence of unique intermediate layers not found in conventional polymers, the present multi-layer structure polymer composition is able to give flexible shaped articles having transparency comparable to that of methacrylic resins and favorable resistance to stress whitening.

elastomeric layer (B) inclusive are graftlinked, the shapability of the resulting polymer composition is significantly improved, whereas the transparency and resis- Table 1

Effect of intermediate layer in multi-layer structure polymer composition

| | Polymer composition and monomer ratio | | | | | | | Characteristics of extrudate (25-mm φ extruder) | | |
|---|---|---|---|---|---|---|---|---|---|---|
| | M/Ⓑ | M/Ⓑ | M/Ⓑ | M/Ⓑ | M/Ⓑ | M/Ⓑ | M/Ⓑ | Shapability | Transparency | Resistance to stress whitening |
| Comp. Ex. (a) | 70/30 | | | | | | | ◉ | Δ | Δ |
| Comp. Ex. (b) | 35/⓪ | 0/㉚ | 35/⓪ | | | | | x | x | Δ |
| Run No. 1 | 10/⓪ | 9/⑥ | 6/⑨ | 0/⑮ | 6/⑨ | 9/⑥ | 15/⓪ | ◉ | ◉ | ◉ |
| Run No. 2 | 10/⓪ | 10/⑤ | 0/⑮ | 5/⑩ | 7.5/⑦.⑤ | 10/⑤ | 15/⓪ | ◉ | ◉ | ◉ |
| Comp. Ex. (c) | 0/⑮ | 5/⑩ | 10/⑩ | 10/⑤ | 35/⓪ | | | x | Δ | x |

Note:
0.5 % of AMA was incorporated into 100 parts of each layer except for the (C)layer (the outermost layer).
M: MMA Ⓑ: BuA Rating: ◉ very good, ○ good, Δ fair, x very poor.

EXAMPLE 2

In the same reactor as in Example 1 were charged 300 parts of ion-exchanged water, 0.5 part of an α-olefin sulfonate, and 0.05 part of SFS. In a manner similar to that in Example 1, multi-layer structure polymer compositions were obtained as shown in Table 2. In Comparative Example (d) no AMA was included. In Comparative Example (e) 0.5% of AMA was included in 100 parts of each of the first, second, and third layers. In Comparative Examples (e) and (f) and Run Nos. (3) and (4), AMA was included, in proportions as shown in Table 2, in every layer except for the last layer (C). In Run Nos. 5 and 6, the procedure of Run No. 3 was repeated except that TAIC and TAC were used respectively in place of AMA. In Comparative Examples (h) and (i), the procedure of Run No. 4 was repeated except that EDMA and BD were used, respectively.

The dry powders obtained in the same manner as in Example 1 were tested by means of an extruder for shapability, transparency, and resistance to stress whitening. The results obtained were as shown in Table 2.

As shown in Comparative Example (d), when the layer had not been graftlinked together by use of AMA, the resulting polymer composition became inferior in shapability, transparency, and resistance to stress whitening owing to interlayer rupture, even if the monomer composition and arrangement in the structure were the same as those in the Example of the present invention.

Comparative Example (e), wherein from first to third layers were graftlinked together by inclusion of AMA, showed that when at least the layers of from first to the tance to stress whitening of the final molded article are somewhat inferior. The effect of the present invention is the greatest when at least three layers are graftlinked, preferably all of the intermediate layers until the outermost layer (C) are graftlinked (Run Nos. 3 and 4).

The amount of AMA used is related directly to the amount of graftlinkage. When too small an amount of AMA is used, as in Comparative Example (e), the resulting polymer composition is unsatisfactory in shapability, transparency, and resistance to stress whitening because of insufficiency in effective interlayer graftlinkage.

On the other hand, if an excess of AMA is used, as in Comparative Example (f), the elasticity brought about by inclusion of BuA is detracted, resulting in deterioration in fundamental physical properties of the molded article obtained from the polymer, although the transparency and resistance to stress whitening are improved.

AMA (Run No. 4) may be effectively replaced by TAIC (Run No. 5) or TAC (Run No. 6). If EDMA [Comparative Example (h)] or BD [Comparative Example (i)] is used in place of a graftlinking agent containing an allyl group, no interlayer graftlinking is possible, although intralayer crosslinkages are produced, and the resulting polymer composition behaves similarly to the polymer obtained in Comparative Example (d), and the desired excellent properties are not obtained. It is therefore evident that the amount of effective interlayer graft-linkages is important in order to obtain a sufficient effect of intermediate layers.

Table 2

Type and amount to be used of graftlinking agent.
Polymer composition and monomer ratio

| | Graft-linking agent (ppm.) | Layer A | | Layer B | | | Layer C | | | Shapability | Transparency | Folding stress whitening |
|---|---|---|---|---|---|---|---|---|---|---|---|---|
| | | M/Ⓑ 10/⓪ | M/Ⓑ 5/⑤ | M/Ⓑ 0/⑩ | M/Ⓑ 5/⑩ | M/Ⓑ 7.5/⑦.⑤ | M/Ⓑ 10/⑤ | M/Ⓑ 22.5/②.⑤ | | | | |
| Comp. Ex. (d) | AMA | — | — | — | — | — | — | — | x | x | x |
| Comp. Ex. (e) | " | 0.05 | 0.05 | 0.05 | — | — | — | — | ○ | Δ | Δ |
| Comp. Ex. (f) | " | 0.005 | 0.005 | 0.005 | 0.005 | 0.005 | 0.005 | — | Δ | Δ | Δ |
| Run No. 3 | " | 0.05 | 0.05 | 0.05 | 0.075 | 0.075 | 0.075 | — | ◉ | ◉ | ◉ |
| Run No. 4 | " | 0.20 | 0.20 | 0.2 | 0.30 | 0.30 | 0.30 | — | ○ | ◉ | ◉ |
| Comp. Ex. (g) | " | 0.60 | 0.60 | 0.60 | 0.9 | 0.90 | 0.90 | — | x | ◉ | ◉ |
| Run No. 5 | TAIC | 0.05 | 0.05 | 0.05 | 0.075 | 0.075 | 0.075 | — | ◉ | ○ | ○ |
| Run No. 6 | TAC | 0.05 | 0.05 | 0.05 | 0.075 | 0.075 | 0.075 | — | ◉ | ○ | ○ |
| Comp. Ex. (h) | EDMA | 0.05 | 0.05 | 0.05 | 0.075 | 0.075 | 0.075 | — | x | x | x |

Table 2-continued

| | Graft-linking agent (ppm.) | Type and amount to be used of graftlinking agent. Polymer composition and monomer ratio | | | | | | | Shapa-bility | Trans-parency | Folding stress whitening |
|---|---|---|---|---|---|---|---|---|---|---|---|
| | | Layer A M/Ⓑ 10/Ⓞ | Layer B M/Ⓑ 5/Ⓢ | M/Ⓑ 0/⑩ | M/Ⓑ 5/⑩ | Layer C M/Ⓑ 7.5/⑦.⑤ | M/Ⓑ 10/⑤ | M/Ⓑ 22.5/②.⑤ | | | |
| Comp. Ex. (i) | BD | 0.05 | 0.05 | 0.05 | 0.075 | 0.075 | 0.075 | — | x | x | x |

M: MMA Ⓑ : BuA Rating: ◎ very good, ◯ good, △ fair, x very poor.

EXAMPLE 3

By using an apparatus and a procedure similar to those in Example 1, multi-layer structure polymer compositions having various intermediate layers, as shown in Table 3, were obtained.

The polymer of Run No. 9 had intermediate layers varying in composition in the following manner: MMA/BuA = 1/2, 1/1, and 2/1 from the (B) layer to the (C) layer. Performance characteristics of this polymer were favorable without intermediate layer between the (A) and (B) layers.

Although the preferable number of intermediate layers between the (B) and (C) layers is generally at least three, two intermediate layers are sufficient for imparting favorable performance characteristics to the polymer composition if the monomer composition of the intermediate layer is such that MMA/BuA = 2/3 and 3/2 as in Run No. 7. The number of intermediate layers may be freely increased depending on the intended final use of the polymer as in Run Nos. 10, 11 and 12. Run No. 13 represents a four-layer structure in which the number of intermediate layers is minimum.

Thoroughly dried pellets of each polymer were shaped into a film 100 μ in thickness, by means of an extruder provided with a flat extrusion die, 10 cm in width of the opening, at a take-off rate of 10 m/minute and the film characteristics were evaluated. Transparency was tested on a sheet prepared by compression molding from the film. The results obtained were as shown in Table 3.

The polymers of Comparative Examples (a) and (c) are, respectively, on MMA/BuA copolymer and a multistage polymer in which the innermost layer is of an elastomeric component as shown in Example 1.

The polymers prepared according to the present invention showed excellent luminous transmittance and haze level and gave films having greater strengths, as compared with the copolymer (a), and were completely resistant to folding stress whitening. The retention of the tensile strength of each sample of this invention was 98 to 99 % after exposure for 500 hours in a weatherometer accelerated exposure tester.

Table 3

Relation between physical properties and intermediate layers in multi-layer structure polymer composition.
Polymer composition and monomer ratio (0.5 % of AMA was added for 100 parts of each layer except for the outermost layer)

| | M/Ⓑ | M/Ⓑ | M/Ⓑ | M/Ⓑ | M/Ⓑ | M/Ⓑ | M/Ⓑ | M/Ⓑ | M/Ⓑ |
|---|---|---|---|---|---|---|---|---|---|
| Run No. 7 | 15/Ⓞ | 10/Ⓢ | 0/⑮ | 6/Ⓙ | 9/Ⓒ | 22.5/②.⑤ | | | |
| Run No. 8 | 10/Ⓞ | 10/Ⓢ | 5/Ⓢ | 0/⑮ | 5/Ⓢ | 10/Ⓢ | 22.5/②.⑤ | | |
| Run No. 9 | 15/Ⓞ | 0/⑮ | 5/⑩ | 7.5/⑦.⑤ | 10/Ⓢ | 22.5/②.⑤ | | | |
| Run No. 10 | 10/Ⓞ | 6.7/③.③ | 0/⑩ | 5/⑩ | 5/Ⓢ | 6.7/③.③ | 31.5/③.⑤ | | |
| Run No. 11 | 10/Ⓞ | 6.7/③.③ | 3.3/⑥.⑦ | 0/⑩ | 3.3/⑥.⑦ | 5/⑤.⑤ | 6.7/③.③ | 27/③ | |
| Run No. 12 | 10/Ⓞ | 6.7/③.③ | 5/Ⓢ | 3.3/⑥.⑦ | 0/⑩ | 3.3/⑥.⑦ | 5/Ⓢ | 6.7/③.③ | 18/② |
| Run No. 13 | 10/Ⓞ | 0/㉔ /1(BD) | 7.5/⑦.⑤ | 47.5/②.⑤ | | | | | |
| Comp. Ex. (a) | 70/㉚ | | | | | | | | |
| Comp. Ex. (c) | 0/⑮ | 5/⑩ | 10/⑩ | 10/Ⓢ | 35/Ⓞ | | | | |

| | Shapa-bility (25-mm φ extruder) | Folding stress whiten-ing (sheet) | Tensile strength and elongation | | Tear strength | Transparency | | |
|---|---|---|---|---|---|---|---|---|
| | | | kg/cm² | % | kg/cm | % Luminous transmit-tance | Haze % |
| Run No. 7 | ◎ | ◎ | 301 | 128 | 4.2 | 89.0 | 5.2 |
| Run No. 8 | ◎ | ◎ | 302 | 114 | 4.1 | 89.2 | 5.1 |
| Run No. 9 | ◎ | ◎ | 302 | 150 | 4.2 | 88.4 | 5.3 |
| Run No. 10 | ◎ | ◎ | 300 | 160 | 4.4 | 89.3 | 4.9 |
| Run No. 11 | ◎ | ◎ | 283 | 197 | 4.8 | 90.1 | 4.8 |
| Run No. 12 | ◎ | ◎ | 245 | 186 | 5.0 | 90.0 | 4.8 |
| Run No. 13 | ◎ | ◯ | 291 | 168 | 3.8 | 90.0 | 3.4 |
| Comp. Ex. (a) | ◎ | △ | — | — | 2.0 | 80 | 13 |
| Comp. Ex. (c) | x | x | — | — | 3.9 | 77 | 14 |

Note:
Tensile strength
 and elongation at break:
  100 μ film thickness;
  rate of drawing,
  100% min. (JIS Z-1702)
Tearing strength:
Elemendorf method;
 slit, 2 mm (JIS P-8116)
Transparency:
 Integrating sphere hazemeter
 (ASTM D 1003-61)

Rating: ◎ very good, ◯ good, △ fair, × very poor

EXAMPLE 4

Following the procedure used in Example 1, the series of multi-layer structure polymer compositions shown in Table 4 were obtained. With an increase in BuA content of the innermost layer (A), a bluish color appeared in the molded article and when the content exceeded 50%, a distinctly bluish haze was developed and the article became susceptible to stress whitening [Comparative Example (j)]. As seen from Table 4, a favorable effect of BuA on the performance characteristics of the final polymer was obtained when the amount incorporated into the (C) layer was 10 to 80 parts, and when incorporated into the (B) layer, 5 to 45 parts are effective.

10 to 40 kg.cm/cm², in contrast to a low value of 3 to 5 kg.cm/cm² of PMMA used as control.

Thus, it is clear that the polymer composition of this invention has transparency, resistance to stress whitening, weather resistance, and impact resistance together.

EXAMPLE 5

Several polymer compositions of the present invention were prepared by using the same monomer ratios as used in Run No. 18 in Example 4 and substituting BMA for MMA (Run No. 24), EMA for MMA (Run No. 25), 2-EHA for BuA (Run No. 26), and EA for BuA (Run No. 27). These polymers were found to be good in shapability and substantially satisfactory in transparency and resistance to folding stress whitening. In the Table 4

| | BuA content in each layer. | | | | | | Shapa-bility | Trans-parency | Stress whiten-ing | Dynstat impact strength, kg.cm/cm² |
|---|---|---|---|---|---|---|---|---|---|---|
| | Polymer composition | | | | | | | | | |
| | M/Ⓑ | M/Ⓑ | M/Ⓑ | M/Ⓑ | M/Ⓑ | M/Ⓑ | | | | |
| Run No. 14 | 10/ ⓪ | 2/⑱ | 4/⑥ | 6/④ | 45/ 5 | | ⊚ | ⊚ | ○ | 33.6 |
| No. 15 | 8/② | " | " | " | " | | ⊚ | ⊚ | ⊚ | 38.4 |
| No. 16 | 6/④ | " | " | " | " | | ⊚ | ○ | ○ | 37.2 |
| Comp. Ex. (j) | 4/⑥ | " | " | " | " | | ⊚ | Δ bluish | x | 39.0 |
| Run No. 17 | 10/⓪ | 0/⑩ | " | " | 54/⑥ | | ○ | ○ | Δ | 13.5 |
| No. 18 | 15/⓪ | 0/⑮ | " | " | 36/④ | | ⊚ | ⊚ | ⊚ | 34.1 |
| No. 19 | 20/⓪ | 0/⑮ | 5/⑩ | 7.5/⑦.5 | 10/⑤ | 10/⓪ | Δ | ○ | ⊚ | 39.7 |
| No. 20 | 5/⓪ | 0/⑨.5 /0.5(BD) | 17.5/⑰.5 | 47.5/②.5 | | | ○ | ○ | ⊚ | 38.1 |
| No. 21 | 5/⓪ | 0/㉙ /1 (BD) | 7.5/⑦.5 | 47.5/②.5 | | | ⊚ | ⊚ | ⊚ | 36.2 |
| No. 22 | 5/⓪ | 0/㊸ /2 (BD) | 2.5/②.5 | 40/⑤ | | | ⊚ | ○ | ○ | 38.6 |
| No. 23 | 5/⓪ | 0/⑨.5 /0.5(BD) | 2.5/②.5 | 72/⑧ | | | ○ | Δ | Δ | 10.1 |

Note:
0.1 % of AMA was incorporated into 100 parts of each layer except for the outermost layer.
M: MMA Ⓑ: BuA Rating: ⊚ very good, ○ good, Δ fair, x very poor.

The polymers of Run Nos. 14 and 18 were extruded into a film, 80 μ in thickness, by the inflation technique and tested for tensile strength and Elemendorf tear strength by the methods mentioned in Example 3. The results were 303 kg/cm² and 3.8 kg/cm, respectively, for the polymer of Run No. 14; 298 kg/cm² and 3.5 kg/cm, respectively, for the polymer of Run No. 18.

The retention of tensile strength of the film after exposure for 500 hours in a weather-meter accelerated exposure tester was 97.8 % (Run No. 14) or 98.2% (Run No. 18).

Pellets of the above polymers were injection molded into test specimens, 100 × 100 × 2 mm. The results of falling ball impact test conducted on the above test specimens and a PMMA plate used as control were 7.8 ft.-lb. (Run No. 14). (Run No. 14), 8.1 ft.-lb. (Run No. 18), and 0.4 ft.-lb. (PMMA).

Several sheets of the film were compression-molded into a plate, 5 mm in thickness, and tested for notched Izod impact strength. The results were 0.90 ft.-lb./in. (V-notch) (Run No. 14), 0.98 ft.-lb./in. (V-notch) (Run No. 18), and 0.41 ft.-lb./in. (V-notch) (PMMA).

In Table 4 there are shown results of Dynstat impact test conducted on specimens similar to those used for the falling ball impact test. As seen from Table 4, the polymers having the multi-layer structure according to this invention showed impact strength values as high as same manner as in Example 3, each polymer was extruded through a flat extrusion die into a film, which was tested for tensile strength and tear strength, whereby the following results were obtained:

| Run No. | 24 | 25 | 26 | 27 |
|---|---|---|---|---|
| Tensile strength, kg/cm² | 253 | 268 | 292 | 235 |
| Tear strength, kg/cm | 3.0 | 2.9 | 3.9 | 3.0 |

EXAMPLE 6

In a manner similar to that in Run No. 13 in Example 3, several polymer compositions were prepared by using various graftlinking agents and polyfunctional monomers as shown in Table 5, and tested for shapability and appearance of the film prepared from the polymers (Run Nos. 28 to 34).

As seen from Table 5, if the amount of AMA used is below 0.1 %, the transparency and gloss of the polymer were decreased owing to insufficient graftlinking (Run No. 28), whereas if the amount exceeds 5 %, the shapability into a film was markedly deteriorated owing to markedly decreased film strength (Run No. 30). When the amount of AMA used was within the specified range, the polymer showed satisfactory physical properties (Run No. 29). The effect of TAC (Run No. 31) or TAIC (Run No. 32) was equivalent to that of AMA.

Polyfunctional monomers such as EDMA may be used other than BD (Run No. 33). If the amount of a polyfunctional monomer exceeds 10 %, the polymer loses its shapability into a film owing to excessive crosslinking (Run No. 34). Therefore, the amount of the polyfunctional monomer should be 10% or lower.

(Run Nos. 35 to 38; 41 to 43). The extruded sheet and injection molded sheet from the blend were excellent in weatherability, transparency, processability, and impact strength. Such remarkable effects were exhibited only when the present multi-layer structure polymer composition is blended.

Table 6

| Run No. | Blend polymers Polymer of Run. No. 15 | Run No. 21 | A | B | C | D | Transparency | Dynstat impact strength kg.cm/cm$^2$ | Tensile strength $\sigma y$ kg/cm$^2$ | Extrudability (0.5 mm and 1.0 mm sheet) |
|---|---|---|---|---|---|---|---|---|---|---|
| 35 | 99 | — | 1 | — | — | — | ◎ | 31 | 310 | ◎ |
| 36 | 80 | — | 20 | — | — | — | ◎ | 28 | 351 | ◎ |
| 37 | 60 | — | 40 | — | — | — | O | 20 | 423 | ◎ |
| 38 | 40 | — | 60 | — | 1' | — | O | 18 | 495 | O |
| 39 | 20 | — | 80 | — | — | — | Δ | 10 | 516 | O |
| 40 | 1 | — | 99 | — | — | — | ◎ | 6 | 530 | Δ |
| 41 | — | 60 | — | 40 | — | — | ◎ | 18 | 412 | ◎ |
| 42 | — | 60 | — | — | 40 | — | ◎ | 13 | 433 | ◎ |
| 43 | — | 60 | — | — | — | 40 | O | 17 | 300 | O |

Note:
A:MMA/BuA (90/10) copolymer; $\eta sp/C = 1.2$ (C = 0.10 g/100 ml CHCl$_3$)
B:MMA/MA (87/13) copolymer; $\eta sp/C = 1.2$ (C = 0.10 g/100 ml CHCl$_3$)
C:PMMA; $\eta sp/C = 1.2$ (C = 0.10 g/100 ml CHCl$_3$)
D:BMA/2-EHA (95/5) copolymer; $\eta sp/C = 1.2$ (C = 0.10 g/100 ml CHCl$_3$)
Rating:◎very good, Ogood, Δ fair, × very poor
Dynsat impact strength: machine direction
Tensile strength, $\sigma y$ : Tensile strength at yield; lo = 5 cm rate of drawing = 100 %/min.

Table 5

| | Graftlinking agent | | Crosslinking agent | | | Shapability into film | Appearance of film | | |
|---|---|---|---|---|---|---|---|---|---|
| Run No. | Type | Amount in layer, % | Type | Amount in elastomeric layer, % | d (Å) | | Transparency | Gloss | Stress whitening |
| 28 | AMA | 0.1 | BD | 5 | 870 | ◎ | Δ | Δ | Δ |
| 29 | AMA | 1.0 | BD | 5 | 860 | ◎ | ◎ | ◎ | ◎ |
| 30 | AMA | 5.0 | BD | 5 | 890 | Δ | ◎ | ◎ | ◎ |
| 31 | TAC | 0.5 | BD | 5 | 900 | ◎ | O | O | O |
| 32 | TAIC | 0.5 | BD | 5 | 800 | ◎ | O | O | O |
| 33 | AMA | 0.5 | EDMA | 5 | 900 | ◎ | Δ | O | O |
| 34 | AMA | 0.5 | BD | 10 | 920 | Δ | ◎ | ◎ | ◎ |

Note:
"d" refers to the diameter of latex particle after completion of polymerization.
Rating:◎very good, Ogood, Δ fair, × very poor.

EXAMPLE 7

In a manner similar to that in Example 1, powder blends of the polymer in Run No. 15 or No. 21 with various copolymers of methacrylates were pelletized and injection molded into test specimens, 2 mm in thickness, which were tested for characteristic properties. The results obtained were as shown in Table 6.

When the proportion of the present multi-layer structure polymer composition blended was small, the improvement in impact strength of the blend was also small (Run No. 40). However, with an increase in proportion of the present polymer composition, the Dynstat impact strength of the blend became remarkably larger than that of a MMA copolymer (Run Nos. 35 to 39). PMMA and MMA copolymers cannot be extruded into a thin sheet of a thickness of up to 2 mm because of brittleness of the resin, whereas the blend was easily extruded into a sheet of a thickness as small as 0.5 mm

EXAMPLE 8

Similarly to Example 7, blends of the present polymer composition of Run No. 15 or No. 21 with various polymers shown in Table 7 were prepared and tested for characteristic properties.

A marked increase in impact strength of PC was noted when blended with the present polymer composition (Run Nos. 45 and 46).

PVC was improved in impact strength and markedly in weather resistance by blending with the present polymer composition. The resulting blend was far less susceptible to stress whitening as compared with a blend of PVC with other diene-based reinforcing materials, indicating the advantage of the present polymer composition (Run No. 48).

When blended with the present polymer composition PSt or PE became inferior in gloss because of little compatibility. Such a phenomenon can be utilized, if necessary, to control the gloss to some extent.

Table 7

| | Blend polymer | | | | | | | | Izod |
|---|---|---|---|---|---|---|---|---|---|
| | Polymer of | | | | | | | | impact |
| Run No. | Run No. 15 | Run No. 21 | PSt | PC | AS | PVC | PE | Transparency | strength, kg.cm.cm$^2$ |
| 44 | 30 | — | 70 | — | — | — | — | x | 8 |
| 45 | — | 20 | — | 80 | — | — | — | x | 80 |
| 46 | 20 | — | — | 60 | 20 | — | — | x | 62 |

Table 7-continued

| | Blend polymer | | | | | | | | Izod impact strength, kg.cm.cm² |
|---|---|---|---|---|---|---|---|---|---|
| | Polymer of | | | | | | | | |
| Run No. | Run No. 15 | Run No. 21 | PSt | PC | AS | PVC | PE | Trans- parency | |
| 47 | 40 | — | — | — | 60 | — | — | x | 14 |
| 48 | 20 | — | — | — | — | 80 | — | Δ | 18 |
| 49 | 5 | — | — | — | — | — | 95 | x | 6 |

Note:
PSt : Polystyrene
AS : AN/St (30/70) copolymer
PC : Polycarbonate
PVC : Polyvinyl chloride
PE : Polyethylene
Izod impact strength: JIS K 6911
Rating: Δ fair, x very poor

What is claimed is:

1. A multi-layer structure polymer composition, comprising: an innermost layer (A), an elastomeric polymer layer (B), and outermost layer (C), and at least one intermediate layer, said layer (A) has a glass transition temperature ($T_g$) of at least 10° C and consisting of 51 to 100 parts by weight of an alkyl methacrylate whose alkyl group has 4 or less carbon atoms, 0 to 49 parts by weight of a monomer having a copolymerizable double bond, 0 to 10 parts by weight of a polyfunctional monomer, and 0.1 to 5 parts by weight of a graftlinking agent; said layer (B) having a ($T_g$) of up to and including 0° C and consisting of 80 to 100 parts by weight of an alkyl acrylate whose alkyl group has 8 or less carbon atoms, 0 to 20 parts by weight of a monomer having a copolymerizable double bond, 0 to 10 parts by weight of a polyfunctional monomer, and 0.1 to 5 parts by weight of a graftlinking, agent; said layer (C) having a ($T_g$) of at least 50° C and consisting of the polymerizate of 51 to 100 parts by weight of an alkyl methacrylate whose alkyl group has 4 or less carbon atoms, and 0 to 49 parts by weight of a monomer having a copolymerizable double bond; and said intermediate layer consisting of 10 to 90 parts by weight of an alkyl methacrylate whose alkyl group has 4 or less carbon atoms, 90 to 10 parts by weight of an alkyl acrylate whose alkyl group has 8 or less carbon atoms, 0 to 10 parts by weight of a polyfunctional monomer, and 0.1 to 5 parts by weight of a graftlinking agent.

2. The polymer composition according to claim 1, wherein the polymer composition comprises 5 to 35% by weight of (A), 5 to 45 % by weight of (B), 10 to 80% by weight of (C), and 5 to 25% by weight of at least one intermediate layer.

3. The polymer composition according to claim 1, wherein at least one of said intermediate layers is present between the (A) and (B) layers and between (B) and (C) layers with the proviso that no intermediate layer need be present between the (A) and (B) layers; and the alkyl methacrylate content of the intermediate layers increases linearly from the (B) layer toward both the (A) and (C) layers.

4. The polymer composition according to claim 1, wherein the polymer composition comprises 5 to 35% by weight of (A), 10 to 45% by weight of (B), 10 to 80% by weight of (C), and 5 to 35% by weight, in total, of at least one intermediate layers between the (B) and (C) layers.

5. The polymer composition according to claim 1, wherein the polymer composition comprises 5 to 35% by weight of (A), 5 to 35% by weight of (B), 10 to 60% by weight of (C), 5 to 25% by weight, in total, of at least one intermediate layers between the (A) and (B) layers, and 5 to 25% by weight, in total, of at least 2 intermediate layers between the (B) and (C) layers.

6. The polymer composition according to claim 1, wherein the polymer composition is produced by polymerizing the components for the (A) layer in the presence of 0.1 to 5% by weight of an anionic emulsifier dissolved in water or in the monomers and subsequently seed-polymerizing the other monomers.

7. The polymer composition according to claim 1, wherein the alkyl methacrylate is methyl methacrylate, the alkyl acrylate is n-butyl acrylate, the graftlinking agent is allyl methacrylate, and the polyfunctional monomer is 1,3-butylene dimethacrylate or ethylene glycol dimethacrylate.

8. The polymer composition according to claim 1, wherein the alkyl methacrylate is methyl methacrylate, the alkyl acrylate is n-butyl acrylate, and the graftlinking agent is allyl methacrylate or triallyl cyanurate.

9. The polymer composition according to claim 1, wherein the alkyl methacrylate is selected from the group consisting of methyl methacrylate, ethyl methacrylate, propyl methacrylate, and butyl methacrylate.

10. The polymer composition according to claim 1, wherein the alkyl acrylate is selected from the group consisting of methyl acrylate, ethyl acrylate, butyl acrylate, propyl acrylate, and 2-ethylhexyl acrylate.

11. The polymer composition according to claim 1, wherein the graftlinking agent is selected from the group consisting of allyl methacrylate, methallyl methacrylate, crotyl methacrylate, allyl acrylate, diallyl maleate, diallyl fumarate, diallyl phthalate, triallyl cyanurate, and triallyl isocyanurate.

12. A resin composition comprising a mixture of 1 to 99% by weight of the multi-layer structure polymer composition as claimed in claim 1 and 99 to 1% by weight of at least one thermoplastic polymer selected from the group consisting of homopolymers and copolymers of at least one monomer represented by the general formula,

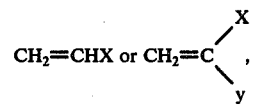

wherein X is H, $CH_3$, Cl, F, Br, $COOCH_3$, CN, $OCOCH_3$, $C_6H_5$, or an alkoxy and Y is H, $CH_3$, Cl, F, or Br; polycarbonates; polyesters; and polyamides.

13. The resin composition according to claim 12, wherein the thermoplastic polymer comprises at least 60% by weight of an alkyl methacrylate whose alkyl group has 4 or less carbon atoms.

14. The resin composition according to claim 12, wherein the thermoplastic polymer comprises at least 60% by weight of polycarbonate.

15. The resin composition according to claim 12, wherein the thermoplastic polymer comprises at least 80% by weight of vinyl chloride.

* * * * *